Oct. 13, 1925.

H. C. MALL

LATHE ATTACHMENT

Filed Aug. 4, 1924

1,556,949

3 Sheets-Sheet 1

Inventor
Henry C. Mall
By O'Connell & O'Connell
his Attorneys

Oct. 13, 1925.

H. C. MALL

LATHE ATTACHMENT

Filed Aug. 4, 1924

1,556,949

3 Sheets-Sheet 2

Inventor
Henry C. Mall
By O'Connell & O'Connell
his Attorneys

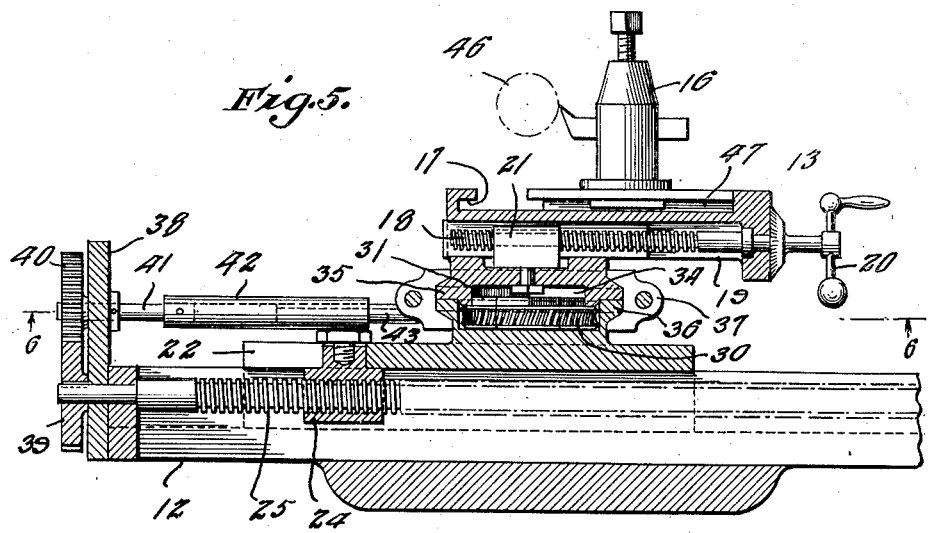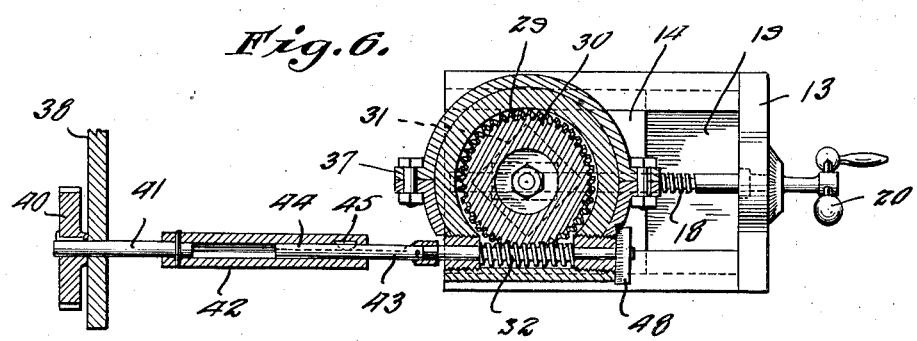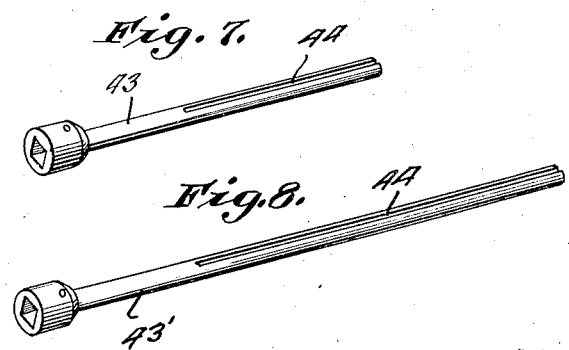

Patented Oct. 13, 1925.

1,556,949

UNITED STATES PATENT OFFICE.

HENRY C. MALL, OF INDIANAPOLIS, INDIANA.

LATHE ATTACHMENT.

Application filed August 4, 1924. Serial No. 729,997.

*To all whom it may concern:*

Be it known that I, HENRY C. MALL, a citizen of the United States, residing at Indianapolis, in the county of Marion and State of Indiana, have invented certain new and useful Improvements in Lathe Attachments, of which the following is a specification.

This invention is an attachment for lathes and is designed for use in machining convex and spherical surfaces wherein the form or contour of the work is generated radially.

A particular object of the invention is to provide an attachment in which the curve is generated by the machine alone, thereby relieving the operator of the necessity of guiding or directing the device and, therefore, eliminating the possibility of an error in the contour occurring through inattentiveness or incompetence on the part of the operator.

A further object is to provide an attachment of the nature referred to which is combined with, and embodied in a compound rest and adapted for use with the regular lathe cross-slide whereby it is capable of being attached to any standard lathe.

A still further object of the invention is to provide a radius and sphere cutting device wherein the tool post is adjustable for various diameters.

Figure 1:
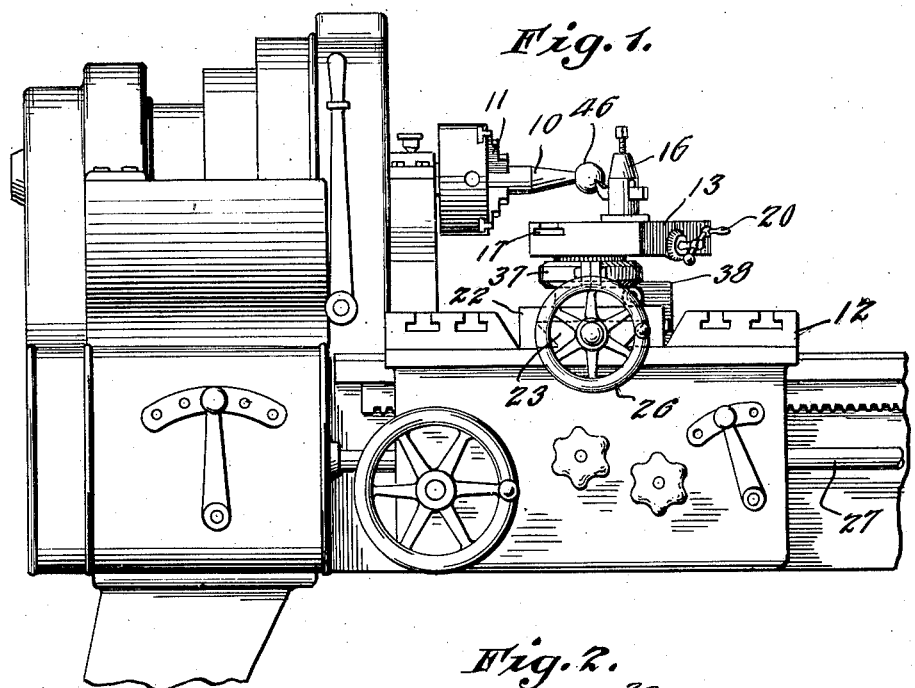
Figure 2:
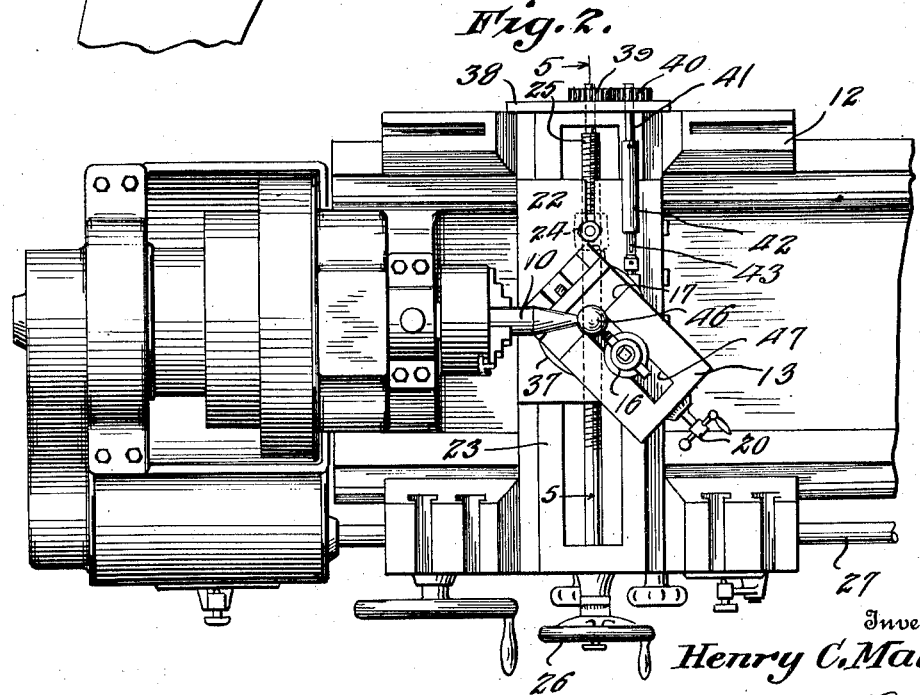
Figure 3:
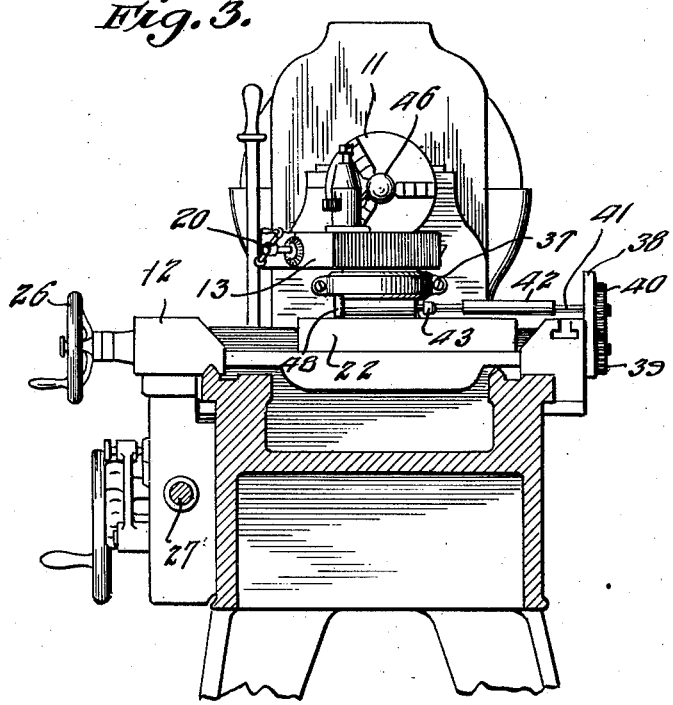
Figure 4:
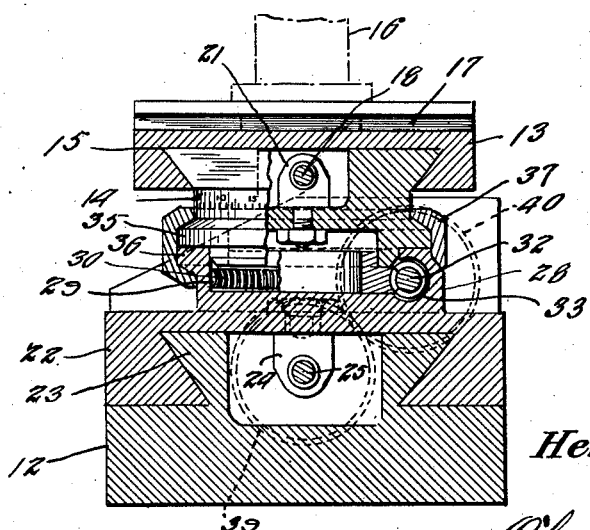

Additional objects and advantages of the device will be apparent from the following description and from the accompanying drawings, wherein:

Fig. 1 is a fragmentary view, in side elevation, of a lathe of conventional design with the attachment in place thereon. Fig. 2 is a top plan view of the same. Fig. 3 is a cross section of the lathe illustrating the manner in which the device is associated with the carriage of the lathe. Fig. 4 is a vertical cross section of the attachment and lathe carriages, illustrating the manner in which the parts of the attachment are assembled and mounted upon the carriage. Fig. 5 is a vertical longitudinal section along line 5—5 of Fig. 2. Fig. 6 is a sectional view along line 6—6 of Fig. 5, and Figures 7 and 8 are detailed views of the socket drive shafts forming part of the invention.

In the drawings, 10 designates the work which is held in chuck jaws 11 of the lathe, and 12, the lathe carriage upon which the attachment is mounted. The compound slide 13 of the attachment is dovetailed for sliding adjustment with a base member 14 as shown at 15 and the tool is held in the ordinary manner in a tool post 16 which enters the tool slot 17 of the slide. The feed of the tool with respect to the work 10 is regulated and controlled in the usual manner by the feed screw 18 arranged within a longitudinal groove 19 on the underside of the slide 13 by which it is carried. This screw is threadedly engaged with a nut 21 stationary with the base 14, as shown in Figs. 4 and 5, and is operated by the hand wheel 20.

A cross-slide 22 of substantially the usual type is dovetailed with the ways 23 of the lathe carriage 12 for movement crosswise of the lathe, being equipped with the usual nut 24 engaged with the cross-slide feed screw 25 of the carriage. As is customary, feed screw 25 may be operated by handwheel 26 or thrown in mesh with the lead screw 27 for automatic operation. For purposes of the present invention, the cross-slide is provided adjacent one end with a raised circular portion 28 adapted to serve as the main base for the compound rest. This portion 28 has a circular recess 29 in which is arranged a worm gear 30 having a square hub 31 adapted to lie flush with the upper edge of the recess.

The worm 32 which engages and drives the gear 30 is conveniently located in a pocket 33 tangent to the recess, as seen in Fig. 6, and has an integral shaft which is journaled between removable bearings closing opposite ends of the pocket; one end of the worm shaft being exposed exteriorly of the pocket and squared for engagement in the socket of one of the socket drive shafts hereinafter referred to. The square hub of the worm gear engages in a squared recess 34 in the underside of the slide base 14 so that the said base and the slide 13 will be turned with the gear, and the base 14 is formed with a flange 35 adapted to bear on the flange 36 of the cross-slide; both flanges being tapered and locked together by a two-part clamping ring 37 as illustrated, thereby providing a swivel joint between the compound rest and the cross-slide. To provide for adjusting the tool for various diameters, the slide 13 has a tool slot 47 cut longitudinally thereof and at a right angle to the slot 17. This slot 47 is of particular advantage in enabling the tool post to be set back considerably when it is required to generate a large radius.

A plate 38 is secured to the far side of the cross-slide carriage 12 and supports the extended end of the worm shaft upon which is keyed the small gear 40 on the end of a shaft 41 which is coupled by a sleeve 42 to a socket drive shaft 43. As indicated at 43 and 43' in Figures 7 and 8 several socket shafts of different lengths may be provided each having a socket at one end to receive the squared end of the worm shaft and being grooved at 44 to provide a lock slot to be engaged by the key 45 of the coupling sleeve.

In using the device, nut 24 of the cross-slide is first removed from the cross-slide feed screw 25 so that the cross-slide 22 will remain stationary during operation of the lathe. The movement of the cross-slide screw 25 will, therefore, be transmitted only to the gear 30 which will be revolved so as to swing the compound slide in the arc of a circle, thereby generating the desired radius and developing the spherical surface 46 of the work.

The worm 32 is provided with a graduated dial 48 and gear 30 is preferably a 90-tooth gear with worm pitch to suit, so that each revolution of the worm equals 4 degrees or one tooth of the gear; the dial on the worm being divided into four equal parts or 4 degrees. Each quarter division of the dial, equalling 1 degree, is subdivided into 60 minute graduations. Hence, in cutting a radius 5 degrees, 17 minutes, the worm would make 1¼ turns and 17 minutes which equals 5 degrees 17 minutes.

From the foregoing it will be apparent that the attachment can be readily and conveniently applied to lathes of standard types and will greatly facilitate the rapid and accurate production of work. Moreover, it is to be understood that the invention is not limited to the precise details of construction and arrangement as are herein set forth but is susceptible of such variation and modifications as fall within the scope of the appended claims.

Having thus described the invention what is claimed is:—

1. A radius generating device comprising a cross-slide presenting a raised circular portion flanged adjacent its upper edge and having a circular recess and a communicating pocket tangent to the recess, a worm gear loosely seated in the said recess and having a square upwardly extending hub, a worm screw within the said pocket and engaging the said worm gear, means for rotating the said worm screw, a rotatable slide base seated upon the said raised portion of the cross-slide, said slide base having a flange adapted to bear on the said flange of the said raised portion and also having a squared recess in its underside to accommodate the square hub of the said worm gear, a longitudinally adjustable slide carried by the said slide base, and a removable clamping ring embracing the said flanges and holding the cross-slide and slide base against separation while permitting relative rotation thereof.

2. A lathe attachment comprising a cross-slide presenting a raised central portion having a horizontal bearing face provided with a central recess and a communicating pocket tangent to the recess, a worm gear removably seated on the bottom of the said recess and presenting a square upwardly projecting hub, a compound slide including a base member resting upon the said bearing face of the said raised portion of the said cross-slide and presenting a square recess in which the said squared hub of the worm gear engages, removable bearings closing opposite ends of the said pocket, a worm shaft journaled in said bearings and having an end extended exteriorly of the said pocket, a worm within the said pocket, said worm being carried by the said shaft and being in driving engagement with the said worm gear, and a drive shaft detachably engaged with the exposed end of the said worm shaft.

In testimony whereof I affix my signature.

HENRY C. MALL.